UNITED STATES PATENT OFFICE.

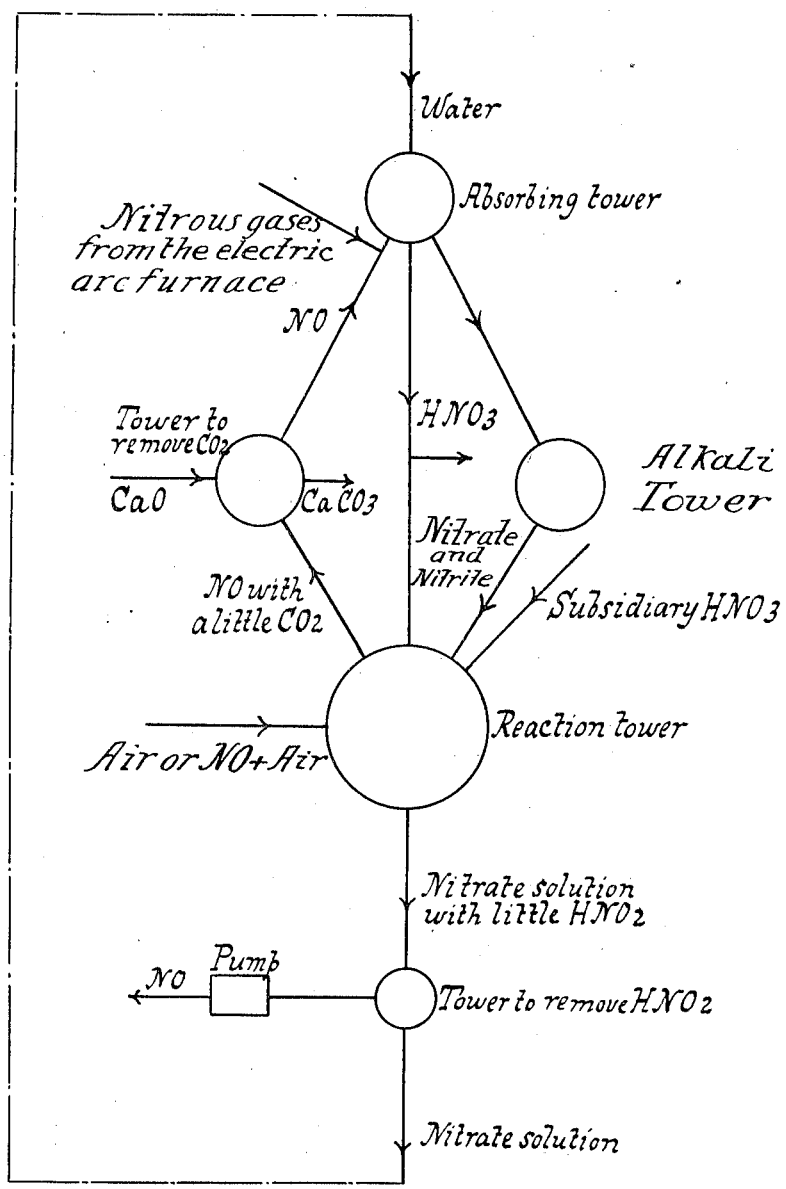

OTTO SCHÖNHERR, OF CHRISTIANIA, AND JOHANNES BRODE, OF CHRISTIANSAND, NORWAY, ASSIGNORS, BY MESNE ASSIGNMENTS, TO NORSK HYDRO-ELEKTRISK KVAELSTOFAKTIESELSKAB, OF CHRISTIANIA, NORWAY.

PROCESS OF MAKING NITRATES AND NITRIC ACID.

1,039,325.  Specification of Letters Patent.  Patented Sept. 24, 1912.

Application filed January 29, 1910. Serial No. 540,883.

*To all whom it may concern:*

Be it known that we, OTTO SCHÖNHERR, Ph. D., and JOHANNES BRODE, Ph. D., chemists, subjects, respectively, of the King of Saxony and the King of Prussia, residing, respectively, at Christiania and Christiansand, Norway, have invented new and useful Improvements in Processes of Making Nitrates and Nitric Acid, of which the following is a specification.

Our invention relates to the production of nitrates.

It has long been known that nitrates are formed and nitrous fumes are evolved when nitrites are treated with nitric acid. The specification of British Letters Patent No. 28,614 A. D. 1904 describes a process for the production of pure nitrates from a mixture of nitrites and nitrates, by treating such mixture with nitric acid (preferably while boiling) and absorbing, by means of the alkalis, earth alkalis, or their carbonates, the gases which are given off. This process requires the separate production of nitric acid to act on the mixture of nitrates and nitrites.

We have found that we can produce commercially pure nitrates from nitrites (whether free from, or in admixture with, nitrates) in a much more advantageous manner by acting on such nitrites with nitric acid, then adding to the gases which are evolved so much oxygen (either as such or in gases containing free oxygen, such as atmospheric air, or preferably gases which are obtained by passing air through an electric discharge) that the atomic proportion of total oxygen present is, to the quantity of combined nitrogen, as 5 is to 2, or thereabout, or at any rate so that no very great excess of oxygen is present, and then subjecting these gases to the absorbing action of water, or absorbing agent containing water but containing no basic compound. In this way nitric acid is obtained and this, or a part thereof, can be used in the further treatment of a fresh quantity of nitrite. The gases which are obtained by treating nitrites with nitric acid, on being mixed with such quantities of oxygen, or oxygen-containing gases as aforesaid, contain such proportion of the higher oxids of nitrogen that their absorption requires comparatively small apparatus. The use of the gases obtained by treating air in an electric arc is particularly advantageous when carrying out our process, because the quantity of nitrogen oxids contained in such gases is thereby raised from about two per cent. to considerably above this, and consequently the absorption proceeds much better. Even if only so much of the nitrous gases be absorbed that two per cent. remain in them when they leave the acid absorbing apparatus (that is, the apparatus in which the gases are treated with water, or with a non-alkaline aqueous solution, and in which nitric acid is produced), and enter the apparatus where they are treated with alkaline compounds (that is, the apparatus in which nitrite, or a mixture of nitrate and nitrite, is produced), the whole of the nitric acid which has been added to the nitrite is regenerated as such, and consequently the conditions are such as are necessary for a continuous process. If, however, the absorption be carried out so that less than two per cent. of nitrous gases remain in the gaseous mixture leaving the acid absorbing apparatus, an excess of nitric acid is obtained. A further advantage of the process according to our invention is that dilute nitric acid can be used for the treatment of nitrites, whereas by the absorption of the gases evolved it is possible to obtain a solution of nitric acid containing sixty-three per cent. of pure acid, that is, a fairly concentrated nitric acid, which is commercially valuable, is produced as a by-product. Of course, nitric acid which has been produced in any other manner can be employed for adding to the nitrite, for instance the dilute nitric acid which is produced when the furnace gases are treated directly with water in any suitable absorbing apparatus.

The dilution of the nitrate solutions obtained depends on the strength of the nitric acid which is added to the nitrite, and it is often advantageous to make use of a mixture of nitric acid with a solution of nitrate, instead of the nitric acid alone. Such mixture of nitric acid with a solution of nitrate is obtained, for example, when nitrous gases are absorbed in a solution of nitrate instead of in pure water. This modification of the process is useful when working on a large scale, because a portion of the nitrate solution obtained can be employed for the absorption of the nitrous gases, and then, when it contains sufficient nitric acid, it can be added to the nitrites, whereupon the nitrites are converted into nitrates and a more concentrated solution of nitrates is obtained. As a rule the gases obtained by treating a solution of a nitrite with nitric acid contain nitric oxid (NO) and very little, or no, other oxid of nitrogen. In some cases, however, for instance when lime has been used for the production of the nitrite, it is difficult to avoid some carbonate becoming mixed with the nitrite and consequently when the nitrite solution is treated with nitric acid the nitric oxid evolved contains some carbon dioxid. It is difficult to separate carbon dioxid from nitrogen trioxid and nitrogen peroxid so that in order to be able to produce nitrates and nitrites free from carbonates we bring the gases evolved on treating the nitrite with nitric acid and which contain principally nitric oxid, into contact with a suitable alkaline substance before adding any oxygen to them. By this means, the carbon dioxid is absorbed, while the nitric oxid is unaffected and can be subsequently treated with oxygen in any desired manner as aforesaid, and then be subjected to the action of the non-alkaline aqueous absorbent so as to effect the absorption of the higher oxids of nitrogen thus formed. The suitable alkaline substance can be employed in a solid, or in a dissolved state, or in the form of a suspension such for instance as milk of lime.

The process can be carried out in any suitable kind of apparatus, and, if desired, the different steps of the operation, or several of them, can be carried out in the same apparatus. For instance, the nitrous gases set free can, after being mixed with the requisite amount of oxygen, be caused to act on the nitrite in the same apparatus in which the said gases were evolved. In this case, the quantity of nitric acid originally added to the nitrite can be less than that theoretically required to convert the nitrite into nitrate. The process should be so carried out that the gases come as thoroughly as possible into contact with the solution containing the nitrite, and for this purpose we prefer to make use of towers through which the gases are passed and down which the solution of nitrite is allowed to trickle.

A modification of this process consists in acting on a solution of a nitrite or a solution containing nitrite and nitrate with nitric acid, allowing the gases evolved (containing oxids of nitrogen) to mix with oxygen, then causing the higher oxids of nitrogen formed to be absorbed by means of water or a non-alkaline aqueous absorbent, and then immediately allowing the nitric acid thus formed to react on a fresh quantity of solution containing nitrite, at the same time allowing a small excess of acid to take part in the reaction. This modification is of particular advantage, since if the quantity of nitrite contained in the solution being treated should vary, for instance diminish, the quantity of oxids of nitrogen evolved will be smaller and consequently the amount of nitric acid returning to act on the new solution of nitrite also diminishes. In this way the accumulation of a large excess of nitric acid is avoided. In a similar manner, if a solution which is stronger in nitrite be employed, after a short time the absolute quantity of nitric acid being returned from the absorber increases in proportion, consequently the process adapts itself automatically to the conditions obtaining. This particular modification can for instance be carried out by allowing the nitric acid which is being returned from the absorber to mix with the solution containing nitrite in a mixing vessel and at the same time allowing the small excess of nitric acid, which is preferably added in order to make sure that all the nitrite is decomposed, to run into the vessel. A current of gas containing free oxygen, for instance air, is passed in suitable quantity through the said mixing vessel, being introduced at or near the bottom thereof. A solution of nitrate can be run off continuously from the mixing vessel. The small quantity of excess acid aforesaid can either be added directly, or it can be actually formed in the mixing vessel by passing into the vessel gases containing oxids of nitrogen, such for instance as those which are produced in an electric furnace when air is submitted to the action of an electric arc, or if desired the said gases can be passed directly into the absorber.

In order to obtain a solution of nitrate free from nitrous acid, we prefer to subject the solution to the action of a fairly high negative pressure, for instance one-tenth of an atmosphere, whereupon nitric oxid is rapidly evolved and a part of the nitrous acid is converted into nitric acid and remains in the solution. The removal of the nitrous acid is preferably carried out while keeping the liquid in motion, and we have found that it is particularly advantageous to allow the solution to run down towers which are kept under negative pressure. This removal of nitrous acid can of course be carried out continuously, the solution to be treated being run into the vessel while a continuous stream of liquid which has been freed from nitrous acid is taken away from the vessel. For instance a solution of nitrate containing nitrous acid such as is obtained by treating a solution of nitrite and nitrate with nitric acid, is drawn into a tower which is kept under a considerable negative pressure. While the liquid is in the tube leading to the tower or in the tower itself, nitric oxid is evolved and should be drawn away by means of a vacuum pump, which is preferably kept alkaline, while the solution which has been freed from nitrous acid runs from the tower down a long pipe which is so arranged that the weight of the liquid in this pipe corresponds to the difference between the atmospheric pressure and the pressure in the tower.

The vacuum pump can be maintained alkaline by any of the well known methods, for instance milk of lime may be sprayed into the cylinder on the suction side of the piston, or a layer of milk of lime may be kept permanently interposed between the piston and the gases which are being pumped, the cylinder in this case being situated vertically.

The process of our invention is particularly useful for the production of pure nitrates from mixtures of nitrates and nitrites, because such mixtures are generally obtained during the absorption of nitrous gases by an alkaline absorbing agent, such as sodium carbonate, milk of lime, and the like.

In order that the invention may be better understood, reference may be had to the accompanying drawing which illustrates diagrammatically the several steps of a cyclical process embodying the invention, but we do not wish to be understood as restricting our invention to anything shown in the drawing.

Now what we claim is:—

1. The process of producing nitrate and nitric acid by treating a nitrite with nitric acid, adding a limited quantity of oxygen to the gas which is evolved during said treatment, and then subjecting the gaseous mixture so obtained to the action of water.

2. The process of producing nitrate and nitric acid by treating a mixture of nitrite and nitrate with nitric acid, adding a limited quantity of oxygen to the gas which is evolved during said treatment, and then subjecting the gaseous mixture so obtained to the action of water.

3. The process of producing nitrate by treating a mixture of nitrite and nitrate with nitric acid, adding a limited quantity of a gas containing free oxygen to the gas which is evolved during said treatment, and then subjecting the gaseous mixture so obtained to the action of water.

4. The process of producing nitrate and nitric acid by treating a mixture of nitrite and nitrate with nitric acid, adding a limited quantity of a gas containing free oxygen to the gas which is evolved during said treatment and then subjecting the gaseous mixture so obtained to the action of an absorbing agent containing water but containing no basic compound.

5. The process of producing nitrate and nitric acid by treating a nitrite with nitric acid, then purifying the gases evolved by bringing them into contact with a suitable alkaline reagent for the purpose of absorbing carbon dioxid from the said gases, then adding a limited quantity of oxygen to the residual gas, and then subjecting the whole gaseous mixture to the action of water.

6. The process of producing nitrate and nitric acid by treating a mixture of nitrite and nitrate with nitric acid, then purifying the gases evolved by bringing them into contact with a suitable alkaline reagent for the purpose of absorbing carbon dioxid from the said gases, then adding a limited quantity of oxygen to the residual gas, and then subjecting the whole gaseous mixture to the action of water.

7. The process of producing nitrate and nitric acid by treating a mixture of nitrite and nitrate with nitric acid, then purifying the gases evolved by bringing them into contact with a suitable alkaline reagent for the purpose of absorbing carbon dioxid from the said gases, then adding a limited quantity of a gas containing free oxygen to the gas which is evolved during said treatment, and then subjecting the gaseous mixture so obtained to the action of water.

8. The process of producing nitrate and nitric acid by treating a mixture of nitrite and nitrate with nitric acid, then purifying the gases evolved by bringing them into contact with a suitable alkaline reagent for the purpose of absorbing carbon dioxid from the said gases, adding a limited quantity of a gas containing free oxygen to the gas which is evolved during said treatment and then subjecting the gaseous mixture so obtained to the action of an absorbing agent containing water but containing no basic compound.

9. The process of producing nitrate and nitric acid by treating a nitrite with nitric acid, adding a limited quantity of oxygen to the gas which is evolved during such treatment, and then subjecting the gaseous mixture so obtained to the absorbing action of the aqueous liquid produced by the treatment of the said nitrite with the said nitric acid.

10. The process of producing nitrate and nitric acid by treating a nitrite with nitric acid, then purifying the gases evolved by bringing them into contact with a suitable alkaline reagent for the purpose of absorbing carbon dioxid from the said gases, then adding a limited quantity of oxygen to the residual gas, and then subjecting the whole gaseous mixture to the action of the aqueous liquid produced by the treatment of the said nitrite with the said nitric acid.

11. The process of producing nitrate by treating a nitrite with nitric acid, allowing the gases evolved, which contain nitric oxid, to mix with free oxygen, then causing the higher oxids of nitrogen formed to be absorbed by means of water, and then allowing the nitric acid thus formed to react on a fresh quantity of nitrite, and at the same time adding a small quantity of excess nitric acid to take part in the reaction.

12. The process of producing nitrate by treating a solution of a nitrite with nitric acid, allowing the gases evolved, which contain nitric oxid, to mix with free oxygen, then causing the higher oxids of nitrogen formed to be absorbed by means of water, then allowing the nitric acid thus formed to react on a fresh quantity of solution of nitrite, and at the same time adding a small excess of nitric acid to the reaction mixture.

13. The process of producing nitrate continuously by treating a solution of a nitrite with nitric acid, which process consists in adding free oxygen to the oxids of nitrogen which are evolved during such treatment, then causing the higher oxids of nitrogen which are thus formed to be absorbed by means of water, then allowing the nitric acid thus produced to react on a fresh quantity of a solution of nitrite.

14. The process of producing nitrate continuously by treating a solution of a nitrite with nitric acid, which process consists in adding free oxygen to the oxids of nitrogen which are evolved during such treatment, then causing the higher oxids of nitrogen which are thus formed to be absorbed by means of water, then allowing the nitric acid thus produced to react on a fresh quantity of a solution of nitrite, and also continuously adding a small excess of nitric acid to the reaction mixture.

In testimony whereof we have hereunto set our hands in the presence of two subscribing witnesses.

OTTO SCHÖNHERR.
JOHANNES BRODE.

Witnesses to the signature of Otto Schönherr:
HENRY BONLAMIAH.
M. GULLORMSON.

Witnesses to the signature of Johannes Brode:
AUGUST GEITZ,
SOERRE ULCHRIN.